J. SHAW.
INTERNAL COMBUSTION ENGINE.
APPLICATION FILED MAR. 30, 1914.
1,152,561.
Patented Sept. 7, 1915.
4 SHEETS—SHEET 1.
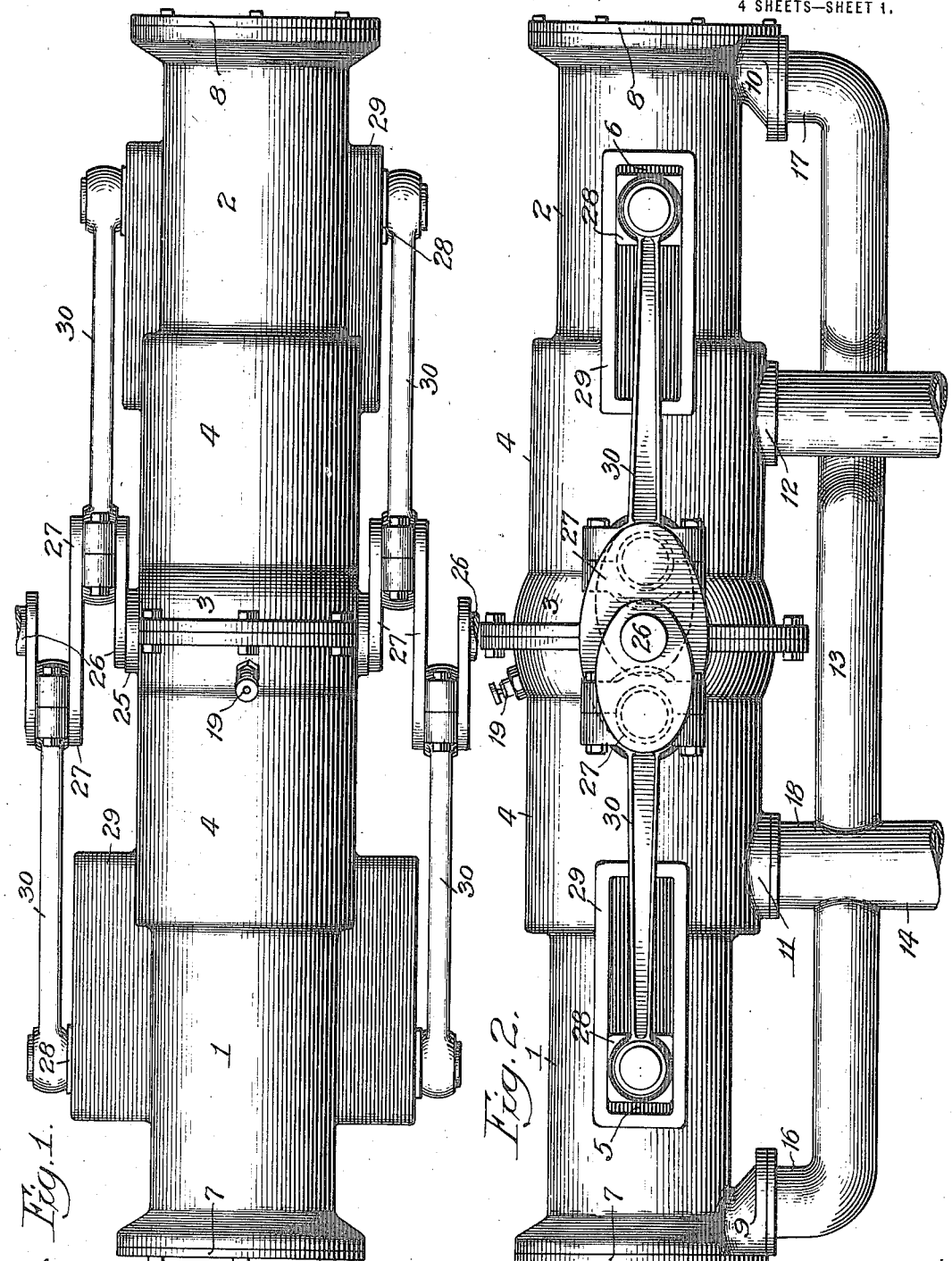
Witnesses:
John Enders
M. H. Holmes
Inventor:
James Shaw,
by Robert Burns
Atty.

J. SHAW.
INTERNAL COMBUSTION ENGINE.
APPLICATION FILED MAR. 30, 1914.
1,152,561.
Patented Sept. 7, 1915.
4 SHEETS—SHEET 2.
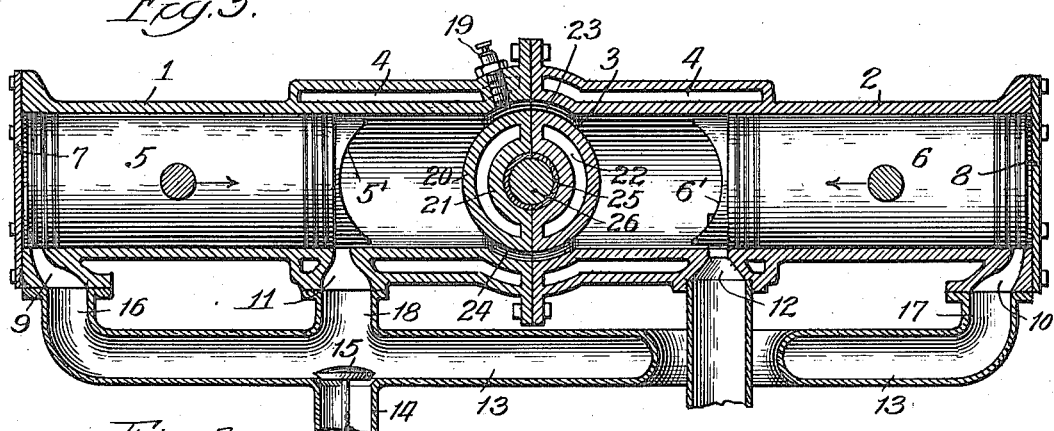
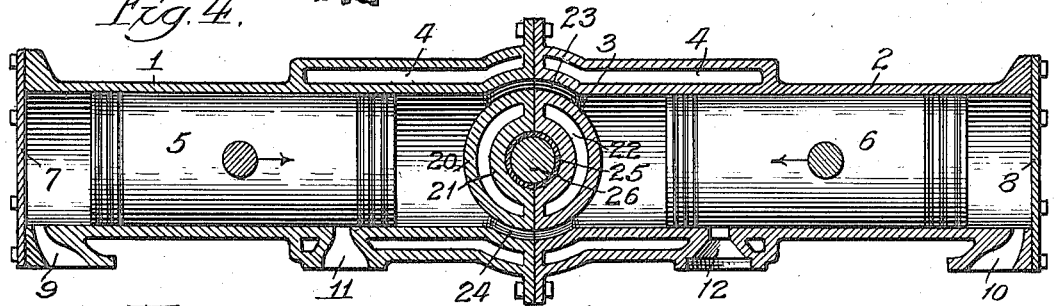
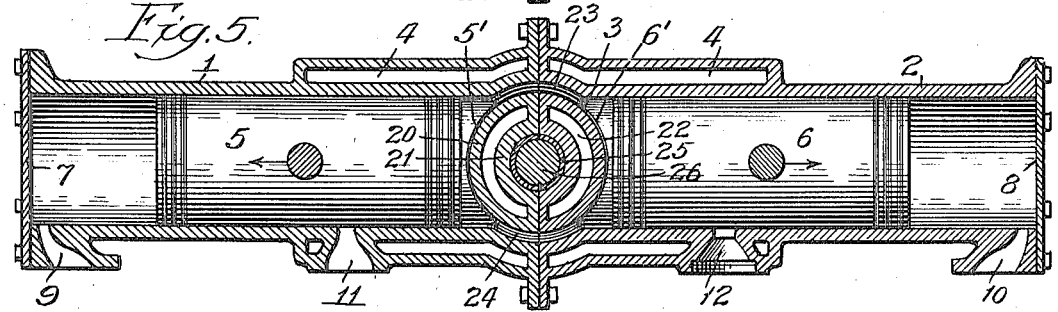
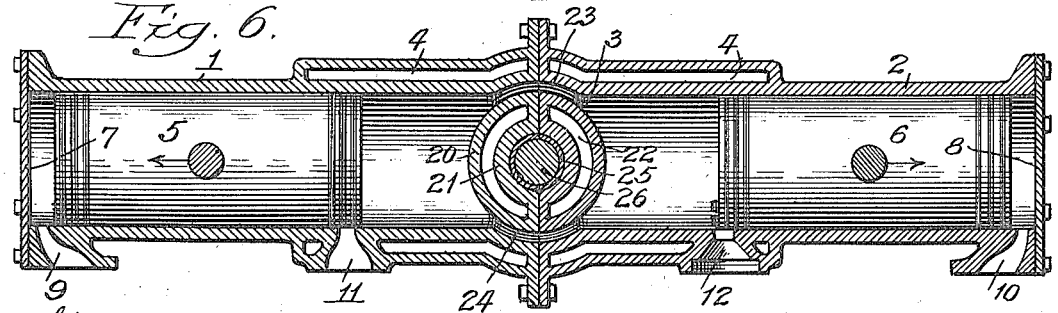
Witnesses:
John Enders
M. H. Holmes
Inventor:
James Shaw,
by Robert Burns
Atty.

J. SHAW.
INTERNAL COMBUSTION ENGINE.
APPLICATION FILED MAR. 30, 1914.
1,152,561.
Patented Sept. 7, 1915.
4 SHEETS—SHEET 3.
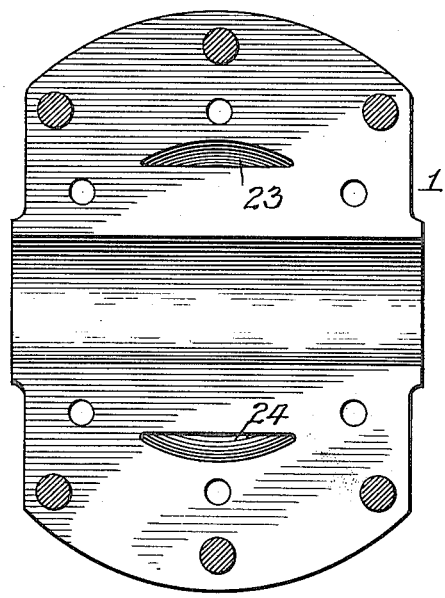
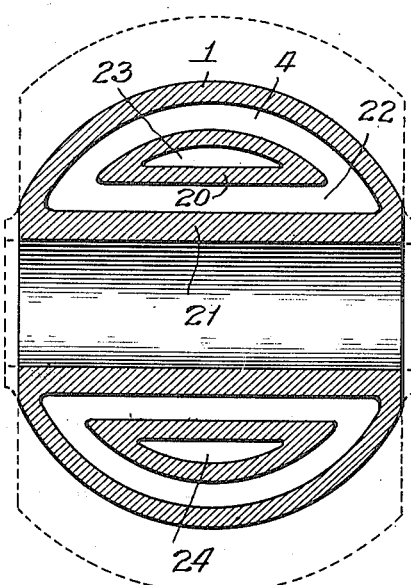
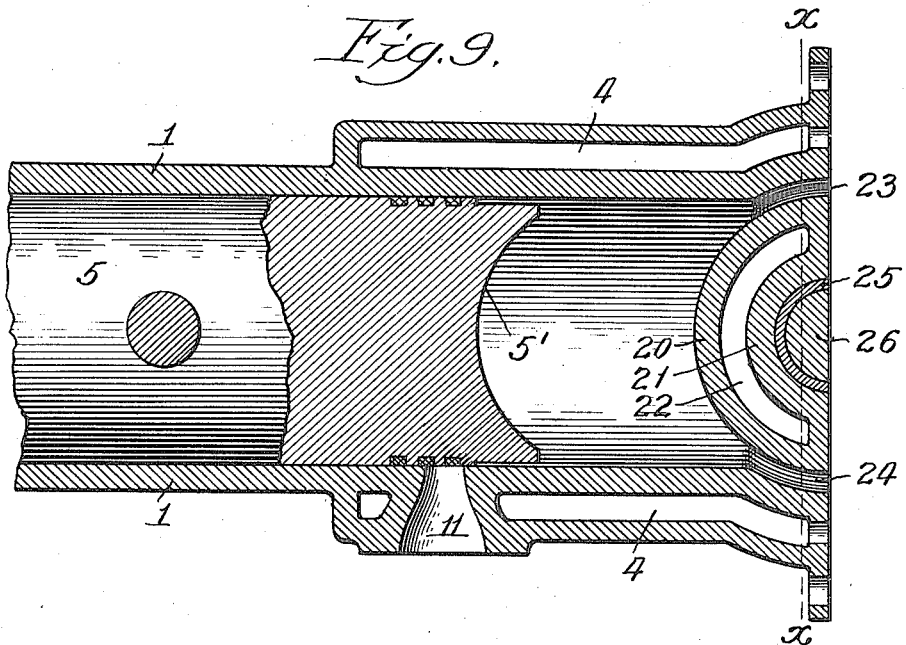

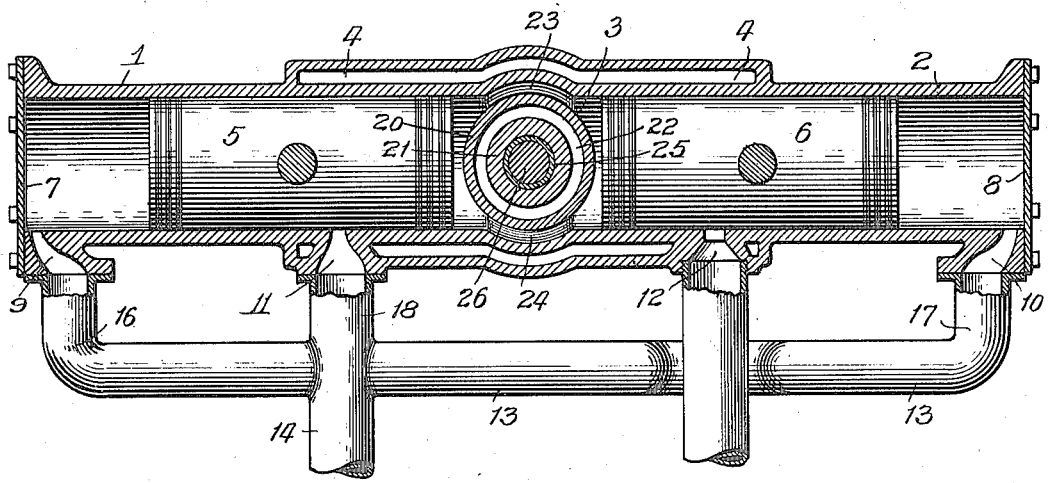
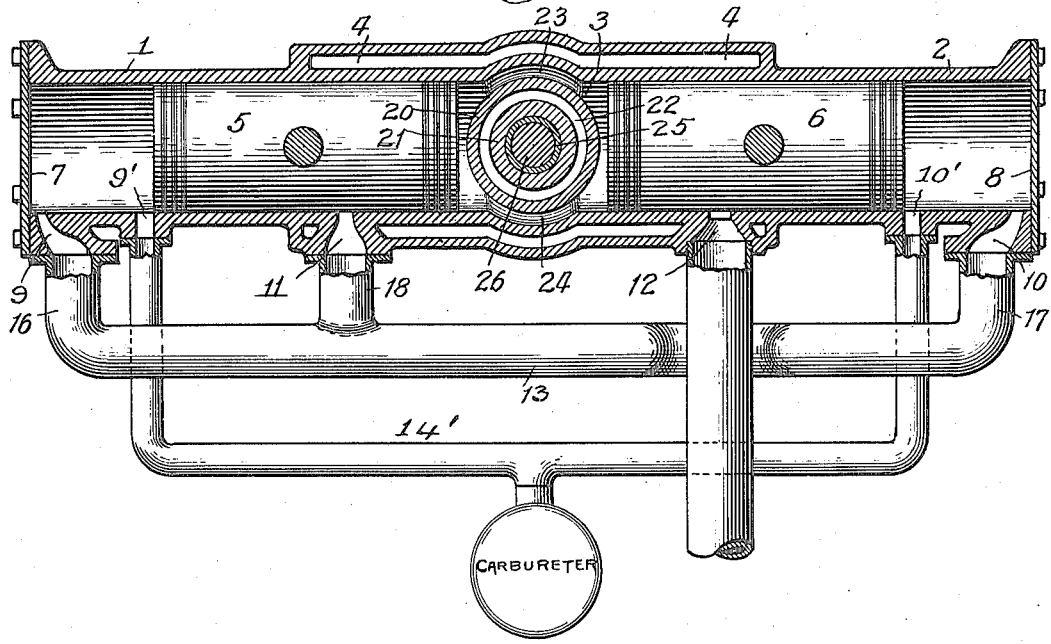

UNITED STATES PATENT OFFICE.

JAMES SHAW, OF LODI, CALIFORNIA.

INTERNAL-COMBUSTION ENGINE.

1,152,561.		Specification of Letters Patent.		Patented Sept. 7, 1915.

Application filed March 30, 1914. Serial No. 828,318.

*To all whom it may concern:*

Be it known that I, JAMES SHAW, a citizen of the United States of America, and a resident of Lodi, in the county of San Joaquin, State of California, have invented certain new and useful Improvements in Internal-Combustion Engines, of which the following is a specification.

This invention relates to that type of internal combustion engines, in which a pair of longitudinally alined piston cylinders are connected to a centrally disposed combustion chamber, and with the engine pistons operatively connected to a centrally located engine shaft so that the action of the connections will be in the nature of pull instead of a thrust upon the crank pins of the engine shaft. And the present improvement has for its object to provide a simple and efficient structural formation and combination of parts, whereby the central combustion chamber of the above type of internal combustion engines, is centrally partitioned to provide means for receiving and carrying the journal bearings of the engine shaft, and at the same time aid in the effective introduction of the supply of gaseous fuel into the combustion chamber, in a very effective combustion of such fuel, and in an efficient removal of the gaseous products of combustion.

Another object is to provide a simple and efficient structural formation of the pistons of the present type of internal combustion engines, whereby a high compression of the gaseous fuel supply is attained in the central combustion chamber of the engine.

Another object is to provide a durable and efficient structural formation, whereby the simultaneously moving pistons of the present class of internal combustion engines, are effectively cushioned at the termination of their outward movement, and assisted in their initial inward movement, all as will hereinafter more fully appear.

In the accompanying drawings:—Figure 1, is a plan view of an internal combustion engine, to which the present invention is applied. Fig. 2, is a side elevation of the same. Fig. 3, is a central longitudinal section, illustrating the pair of pistons of the engine, in their extreme outer positions and with the inlet port uncovered to permit an inflow of gaseous fuel into the central combustion chamber of the engine. Fig. 4, is a similar view illustrating the pair of pistons in a position covering the inlet and exhaust ports, and moving toward each other to effect a compression of the gaseous fuel in the aforesaid combustion chamber. Fig. 5, is a similar view, illustrating the pair of pistons in a position moving away from each other in their active and simultaneous outward movement, under the stress of an ignition or explosion of the gaseous fuel in the combustion chamber. Fig. 6, is a similar view, illustrating the pair of pistons moving outward by momentum, with the outlet port of the engine uncovered to permit an exhaust of the gaseous products of combustion from the central combustion chamber of the engine. Fig. 7, is a detail elevation of an inner end of one of the engine cylinders or casings. Fig. 8, is a detail transverse section on line $x$—$x$, Fig. 9. Fig. 9, is an enlarged detail longitudinal section of the inner portion of one of the engine cylinders, and illustrative of the concave end of the piston of said cylinder. Fig. 10, is a central longitudinal sectional elevation, illustrating the engine cylinders or casing connected together integrally as a single casting. Fig. 11, is a similar view, illustrating a modified form of the fuel supply trunk, etc., of the engine.

Similar reference numerals indicate like parts in the several views.

Referring to the drawings, 1 and 2 represent the pair of approximately counterpart cylinders or casings of the engine, arranged in longitudinal alinement, and expanded at their meeting point to provide a central combustion chamber for the engine. And it is within the scope of this part of the present invention to make said cylinders or casings 1, 2, as separate parts, and secure the same together at their point of juncture, by marginal flanges and bolts as shown in Figs. 1, 2, 3, 4, 5, 6, 7 and 9, or to cast said cylinders or casings 1, 2, as one integrally formed member, as illustrated in Figs. 10 and 11.

The cylinders or casings 1, 2, are formed with the usual water jackets 4, or other usual heat dissipating means, for removing the excess heat from the walls of the engine during a continued operation of the same, and in the present construction said water jackets 4, communicate with water jackets encompassing the journal bearing of the engine shaft, as hereinafter more fully explained, and with a view to prevent excessive passage of heat to said bearing.

5 and 6 are pistons moving in the respective piston chambers of the cylinders 1, 2, aforesaid, and operatively connected to the centrally disposed main shaft of the engine, in manner hereinafter described. In ordinary cases, where only nominal compression of the gaseous fuel previous to combustion, is required, the ends of the pistons 5, 6, will be formed with plane faces next adjacent to the combustion chamber 3. In cases where high compression of such gaseous fuel previous to combustion, is required, the ends of said pistons 5, 6, next adjacent to the combustion chamber 3, will be provided with longitudinal extensions 5' and 6', as illustrated in Figs. 3, 5 and 9, and which are preferably formed with concave end faces of the cylindric type, and complementary to the cylindrical shape of the hereinafter described centrally disposed annular wall of the combustion chamber. With the described construction the pistons as they reach the limit of their inward stroke, are adapted to fill the greater part of the central combustion chamber, and thus effect a high compression of the gaseous fuel contained therein.

7 and 8 are heads closing the outer ends of the piston chambers of the aforesaid cylinders 1, 2, and said heads are secured in place by attaching bolts or other suitable means.

9, 10, 11 and 12, are a series of ports opening into the piston chambers of the cylinders 1 and 2, aforesaid, and in the present improvement said ports are disposed as follows:—The ports 9 and 10, open into the respective piston chambers, near the outer ends of the same, and preferably a short distance removed from the respective end heads 7 and 8, so that the pistons in their outward movement, and when near the end of such outward movement, will cover said ports 9, 10, and create cushion chambers, in which volumes of compressed gases are held as impact cushions for the pistons in their outward movement, and as elastic means for assisting the said pistons in their initial inward movement. The ports 11 and 12 open into the respective piston chambers at points at which they will be uncovered by the pistons when the same are near the end of their outward movement. And said ports are preferably disposed so that the port 12, which constitutes the outlet or exhaust from the combustion chamber, will be the first to be uncovered by its piston, a short period in advance of the uncovering of the port 11, which constitutes the gaseous fuel inlet to the central combustion chamber, aforesaid.

13, is the fuel supply trunk of the engine, preferably formed as a separate manifold, as illustrated in Figs. 2, 3 and 10, but which may be formed in any other usual and suitable manner, in accordance with the judgment of the constructor.

14, is a branch pipe extending from the fuel supply trunk 13 to the carbureter, or other source of fuel supply, and which is provided with a check valve 15, to prevent a reflux or back flow through said branch pipe 14.

16 and 17 are tubular branches on the fuel supply trunk 13, communicating through the ports 9 and 10, with the outer and fuel compression ends of the piston chambers heretofore described.

18, is an intermediate tubular branch on the fuel supply trunk 13, communicating through the port 11, with the central combustion chamber 3 of the engine.

In the modification illustrated in Fig. 11, the fuel inlet pipe 14, and its valve 15, is omitted from the fuel supply trunk 13, and the supply of fuel gas is obtained without the use of any check valve by the following means: 14' is a Y shape pipe or connection extending from a carbureter, or other source of fuel supply, and connected to counterpart ports 9' 10', which in turn open into the outer and fuel compression ends of the respective piston chambers, heretofore described, at points immediately outside the pistons 5 and 6, when the same are in their fully inward position.

19 is a spark plug extending into the combustion chamber 3, for effecting a combustion or explosion of the gaseous fuel at a predetermined period in the cycle of rotation of the engine.

The transverse annular partition of the central combustion chamber 3, heretofore referred to, is of a detail construction as follows:—20 and 21, are two transversely extending annular walls, preferably of the circular form shown and disposed centrally withir the combustion chamber 3 of the engine. Said annular walls 20, 21, are disposed in separated and concentric relation to each other, and in separated and concentric relation to the adjacent upper and lower walls of the combustion chamber, aforesaid.

With the described arrangement an inner water space or jacket 22 is provided around the bearing for the engine shaft, hereinafter described, to prevent the passage of excessive heat thereto, from the combustion chamber, and to such end said water space or jacket 22 has communication with the main water jackets 4 of the engine, heretofore described. In addition, upper and lower connecting passages 23, 24 are formed, and such passages are adapted to effectively connect the two divisions into which the combustion chamber 3, is partly partitioned by the annular walls 20 and 21, aforesaid.

In the construction shown, the annular walls 20, 21, are formed integrally with the side walls of the combustion chamber 3, and where the combustion chamber 3 and the pair of piston cylinders 1, 2, are formed in one piece, as heretofore mentioned, the said annular walls 20, 21, will be continuous and will provide a continuous circular water space or jacket 22, as illustrated in Figs. 10 and 11. Where the engine cylinders 1 and 2, are made as separate pieces, as heretofore described, the annular walls 20, 21, will be made in halves, and each half made integral with its engine cylinder, as illustrated in Figs. 3 to 9, inclusive.

25 is a bearing bushing or sleeve fitting the bore or orifice of the inner annular wall 21, aforesaid, and 26, is the engine shaft having bearing in said bushing 25, and provided near its respective ends with multiple cranks 27 of any usual construction.

28 are cross-heads carried by the respective engine pistons 5 and 6, midway their length, and 29 are longitudinal slideways arranged at the sides of the piston cylinders or casings 1 and 2, and adapted to guide the cross-heads 28, in their reciprocating movement.

30 are pitmen or connecting links operatively connecting the cross-heads 28 to the wrist pins of the cranks 27 of the engine shaft 26, aforesaid.

The construction illustrated in the drawings involves an internal combustion engine of the two-cycle type and in operation is substantially the same as the ordinary two-cycle engine, and briefly stated is as follows:—Assuming the pistons 5 and 6, to be moving outwardly, the supplies of gaseous fuel in the outer portions of the piston chambers of the cylinders 1, 2, are gradually compressed therein, and in the supply trunk 13. As said pistons near the end of their outward movement, the exhaust port 12 is first uncovered, to permit the escape of the burnt gases from the combustion chamber 3, and immediately following such opening of the exhaust port 12, the fuel inlet port 11 is uncovered to admit a supply of compressed gaseous fuel from the aforesaid outer chambers of the engine cylinders 1, 2, and from the supply trunk 13, into the combustion chamber 3, to supply the same with a fresh fuel supply, and at the same time complete the expulsion of the burnt gases through the exhaust port 12. The pistons 5 and 6, now commence their inward movement, and initially cover or close the inlet and exhaust ports 11 and 12, after which said pistons in their further inward movement, draw into the outer piston chambers aforesaid, fresh supplies of gaseous fuel through the supply pipe 14, and supply trunk 13. Simultaneously therewith, said pistons effect the required compression of the gaseous fuel supply in the combustion chamber 3, and as the pistons complete their inward movement, the said gaseous fuel is ignited by the spark plug 19, to cause a succeeding outward movement of the piston in a fresh cycle of operations of the engine, above described.

Having thus fully described my said invention what I claim as new and desire to secure by Letters Patent, is:—

1. An internal combustion engine, comprising a pair of cylinders arranged in longitudinal alinement and provided with end closure heads and with a central combustion chamber, a transverse wall disposed centrally in said combustion chamber and having a transverse orifice, a journal bearing in said orifice, a crank shaft journaled in said bearing, a supply trunk having ports opening into the outer ends of said cylinders and an intermediate port opening into one of said cylinders adjacent to the central combustion chamber, the other cylinder having an exhaust port opening through same adjacent to the combustion chamber, means for introducing supplies of gaseous fuel into the outer portions of the piston chambers of said cylinders, a pair of pistons arranged in the pair of cylinders aforesaid and adapted to cover and uncover the aforesaid ports, and operative connections between said pistons and the crank shaft, substantially as set forth.

2. An internal combustion engine, comprising a pair of cylinders arranged in longitudinal alinement and provided with end closure heads and with a central combustion chamber, a transverse wall disposed centrally in said combustion chamber and having a transverse orifice, a journal bearing in said orifice, a crank shaft journaled in said bearing, a supply trunk having ports opening into the outer ends of said cylinders and an intermediate port opening into one of said cylinders adjacent to the central combustion chamber, the other cylinder having an exhaust port opening through same adjacent to the combustion chamber, a valved fuel gas supply branch connecting with the supply trunk aforesaid, a pair of pistons arranged in the pair of cylinders aforesaid and adapted to cover and uncover the aforesaid ports, and operative connections between said pistons and the crank shaft, substantially as set forth.

3. An internal combustion engine, comprising a pair of cylinders arranged in longitudinal alinement and provided with end closure heads and with a central combustion chamber, a transverse wall disposed centrally in said combustion chamber and having a transverse orifice, a journal bearing in said orifice, a crank shaft journaled in said bearing, a supply trunk having ports opening into the outer ends of said cylinders and an intermediate port opening into one of said cylinders adjacent to the central combustion chamber, the other cylinder having an exhaust port opening through same adjacent to the combustion chamber, the exhaust port being disposed closer to the central combustion chamber than the intermediate port aforesaid, means for introducing supplies of gaseous fuel into the outer portions of the piston chambers of said cylinders, a pair of pistons arranged in the pair of cylinders aforesaid and adapted to cover and uncover the aforesaid ports, and operative connections between said pistons and the crank shaft, substantially as set forth.

4. An internal combustion engine, comprising a pair of cylinders arranged in longitudinal alinement and provided with end closure heads and with a central combustion chamber, a transverse wall disposed centrally in said combustion chamber and having a transverse orifice, a journal bearing in said orifice, a crank shaft journaled in said bearing, a supply trunk having ports opening into the outer ends of said cylinders and an intermediate port opening into one of said cylinders adjacent to the central combustion chamber, the other cylinder having an exhaust port opening through same adjacent to the combustion chamber, the exhaust port being disposed closer to the central combustion chamber than the intermediate port aferesaid, a valved fuel gas supply branch connecting with the supply trunk aforesaid, a pair of pistons arranged in the pair of cylinders aforesaid and adapted to cover and uncover the aforesaid ports, and operative connections between said pistons and the crank shaft, substantially as set forth.

5. An internal combustion engine, comprising a pair of cylinders arranged in longitudinal alinement and provided with end closure heads and with a central combustion chamber, a transverse wall disposed centrally in said combustion chamber and having a transverse orifice, a journal bearing in said orifice, a crank shaft journaled in said bearing, a supply trunk having ports opening into the outer ends of said cylinders and an intermediate port opening into one of said cylinders adjacent to the central combustion chamber, the other cylinder having an exhaust port opening through same adjacent to the combustion chamber, means for introducing supplies of gaseous fuel into the outer portions of the piston chambers of said cylinders, a pair of pistons arranged in the pair of cylinders aforesaid and adapted to cover and uncover the aforesaid ports, and operative connections between said pistons and the crank shaft, the same comprising cross-heads attached to the pistons intermediate their lengths, slideways therefor carried on the walls of the pair of cylinders, and pitmen connecting the cross-heads to the crank arms of the crank shaft, substantially as set forth.

6. An internal combustion engine, comprising a pair of cylinders arranged in longitudinal alinement and provided with a central combustion chamber, a transverse annular wall disposed centrally in said combustion chamber, and having a transverse orifice, a journal bearing disposed in said orifice, a crank shaft journaled in said bearing, a pair of pistons in the pair of cylinders aforesaid, each piston having an extension on the end next to the combustion chamber and said end formed with a concave face of the cylindric type, and operative connections between said pistons and the crank shaft, substantially as set forth.

7. An internal combustion engine, comprising a pair of cylinders arranged in longitudinal alinement and provided with a central combustion chamber, a pair of transverse and concentrically arranged walls disposed centrally in said combustion chamber and forming a central orifice, an annular water space and top and bottom communicating passages between the side portions of the combustion chamber, a journal bearing disposed in the aforesaid orifice, a crank shaft journaled in said bearing, a pair of pistons in the pair of cylinders aforesaid, each piston having an extension on the end next to the combustion chamber and said end formed with a concave face of the cylindric type, and operative connections between said pistons and the crank shaft, substantially as set forth.

8. An internal combustion engine, comprising a pair of cylinders arranged in longitudinal alinement and provided with a central combustion chamber, a transverse wall disposed centrally in said combustion chamber and having a transverse orifice, a journal bearing disposed in said orifice, a crank shaft journaled in said bearing, a pair of pistons in the pair of cylinders aforesaid, the inlets to the outer chambers of the cylinders being disposed a distance inside the outer ends of said chambers to provide closed cushioning spaces for the pistons, and operative connections between said pistons and the crank shaft, substantially as set forth.

Signed at Chicago, Illinois, this 27th day of March 1914.

JAMES SHAW.

Witnesses:
IVA L. CRANE,
ROBERT BURNS.